Aug. 25, 1931. H. M. LACKIE 1,820,311
INCUBATOR
Filed March 27, 1926  3 Sheets-Sheet 1

INVENTOR.
Harry M. Lackie
BY
Erwin, Wheeler & Woolard
ATTORNEYS.

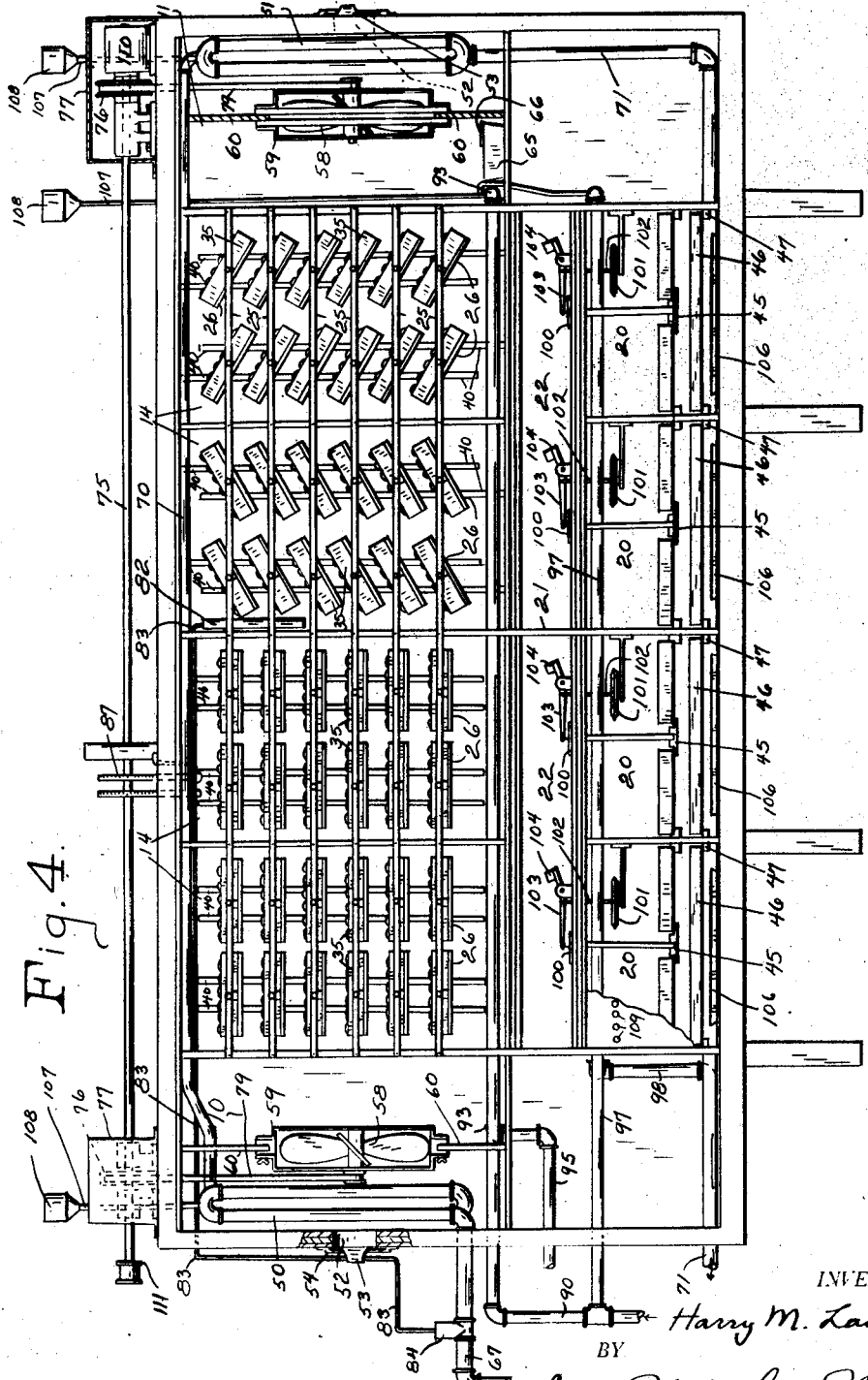

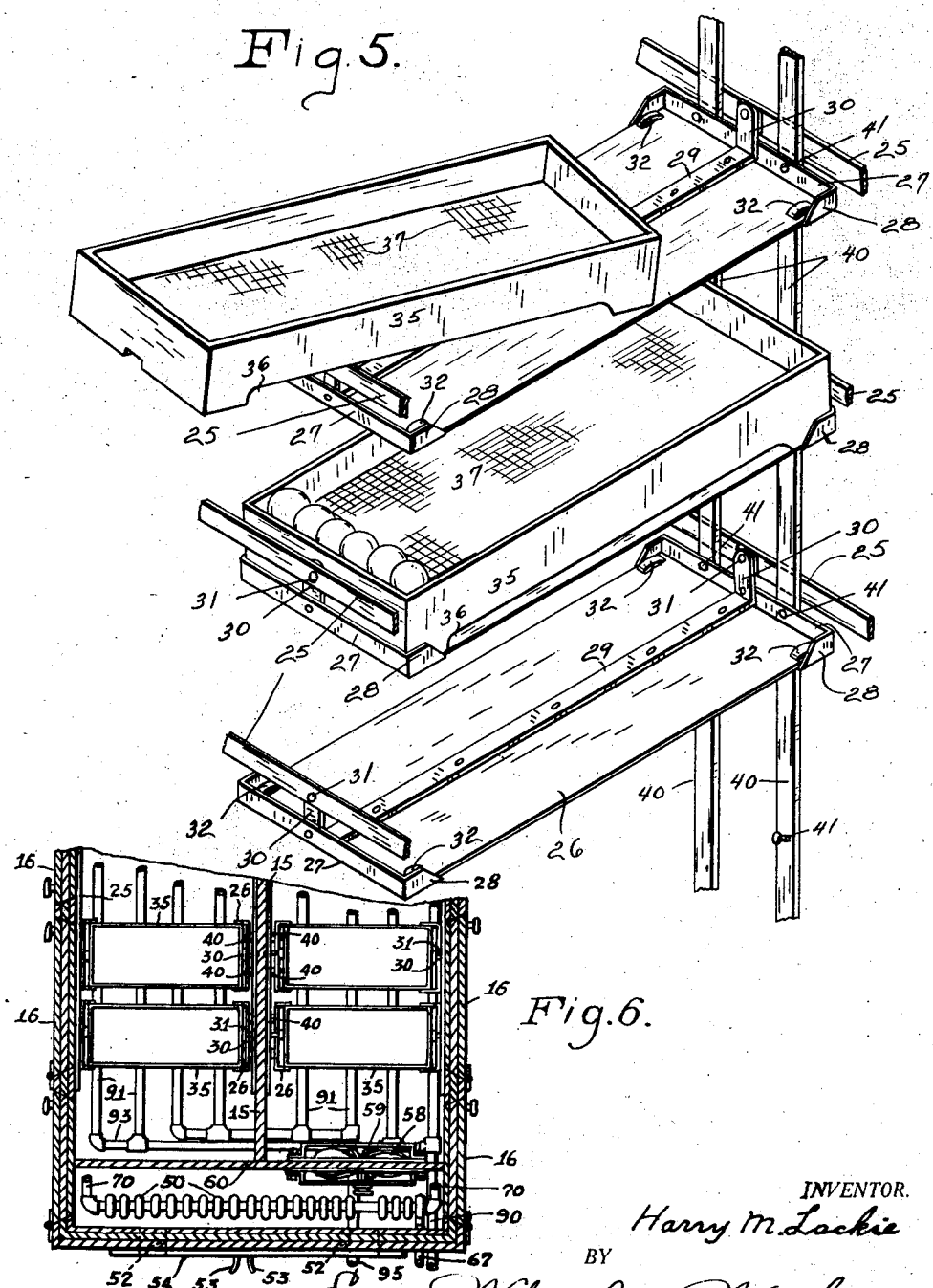

Patented Aug. 25, 1931

1,820,311

UNITED STATES PATENT OFFICE

HARRY M. LACKIE, OF MADISON, WISCONSIN

INCUBATOR

Application filed March 27, 1926. Serial No. 97,879.

My invention relates to improvements in incubators, with particular reference to incubators of that type in which motor operated ventilating systems are employed.

Objects of this invention are to provide means whereby incubator trays and their supports may be utilized to subdivide, distribute and direct the course of air which is being driven through the chambers containing such egg trays; to provide means for heating the air preparatory to its delivery to the egg chambers; to provide means for reversing the direction of the air currents through the egg chambers; to provide means for shifting the egg trays and their supports in a manner to deflect the air in desired directions and successively in different directions to expose the eggs to air currents approaching at different angles and to eliminate areas of non-circulation which might otherwise be developed under changing external atmospheric conditions; to provide improved means for tilting the eggs, in which danger of breakage, due to the shifting of mechanical parts, is eliminated; to provide improved egg trays and improved tray supporting devices; to provide an improved heating system; to provide a compartment incubator designed to permit the advancement of egg trays from one compartment to another and allow conditions of temperature, humidity, etc. to be varied in the several compartments in accordance to requirements suited to the stage of incubation of the eggs therein; and particularly, to provide means for tilting the egg trays and the eggs therein during certain stages of the incubation period and supporting them in relatively stationary positions under different conditions of temperature and humidity and in association with suitable nursery trays during the final stages of the incubation period.

In general, it is an object of this invention to provide an incubator in which conditions can substantially be identically reproduced in successive incubation periods, whereby adjustments showing maximum successful incubation can be maintained indefinitely with substantially identical results for eggs of the same fertility and quality, or vigor.

In the drawings:

Figure 4 is a side elevation with the side wall of the casing removed and with portions of other walls shown in vertical section.

Figure 5 is a detail, showing a set of three superposed tilting trays, together with their associated link connections and fragments of their supporting bars, one of the egg trays being partially removed from its supporting tray.

Figure 6 is a fragmentary view in horizontal section drawn to a plane immediately above the topmost egg trays shown in Figure 4, and below the heating pipe 70.

Like parts are identified by the same reference characters throughout the several views.

Figure 1:
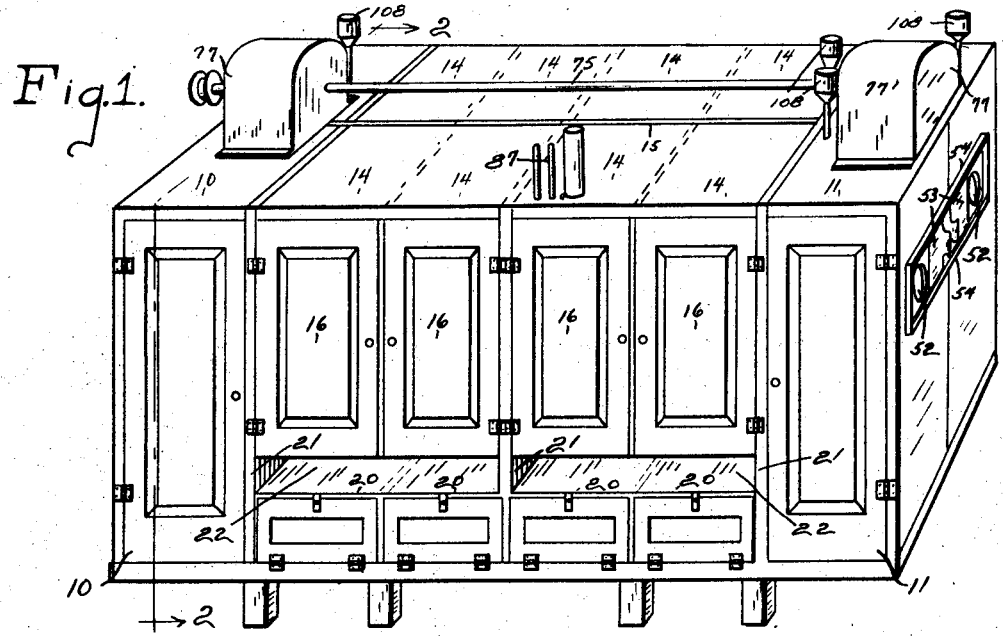
Figure 1 is a perspective view of an incubator, embodying my invention.

The incubator cabinet illustrated in Figure 1 is provided with compartments 10 and 11 at its respective ends and a plurality of intermediate compartments 14. The number of intermediate compartments will be varied according to the capacity of the incubator, but in the incubator shown in Figure 1, there are four intermediate compartments 14 on each side arranged back to back along a central partition 15 and each compartment is provided with a door 16 in its outer wall.

Below the compartments 14 there is a corresponding number of hatching compartments 20 suitably spaced from the compartments 14 by the vertical frame members 21, this space 22 (Figure 4) being adequate to allow free passage of air between the upper and lower sets of compartments 14 and 20 and to facilitate ventilating the lower compartments 20, as hereinafter explained.

Within each compartment 14 there are sets of horizontally extending parallel bars 25, one set of these bars being located adjacent to the doors 16 and the other set adjacent to the rear wall of the compartment,—i. e., the partition wall 15. These bars carry a series of supporting trays, each having a bottom plate 26 with upstanding end flanges 27 having elbowed extensions 28 at the respective corners. The bottom plate is secured to a bar 29, the end portions 30 of which are upturned and connected by pivot pins 31 with the associated front and rear tray supporting bars 25. Near each corner the plate 26 is provided with an upwardly projecting rest 32 upon which an egg tray 35 may be supported in spaced relation to the plate 26. The side wall of each tray 35 is recessed, as indicated at 36, to allow circulation of air between the foraminous bottom 37 of the egg tray and the plate 26.

In the structure as illustrated in Figure 4, there is a vertical series of six parallel bars 25 in each set and each compartment is provided with two vertical series of supporting trays and egg trays, those of each series corresponding in number with the number of bars 25 in each set. The supporting trays of each vertical series are linked along the back wall by a pair of parallel link bars 40, each pivotally connected by pins 41 with the respective supporting trays, said pins extending loosely through apertures in the rear flanges 27 of the supporting trays, whereby when one of the trays is tilted, the link bar 40 on the downwardly moving side will move downwardly and the other bar 40 will correspondingly move upwardly. The bars may be of such length that one of them will strike the bottom of the compartment and the other one the top when the trays are tilted at the proper angle, as illustrated in the right hand compartments 14 in Figure 4.

With the above described construction, it is obvious that the egg trays 35 may be supported in horizontal positions, as indicated in the two left hand compartments in Figure 4. Also, that they may be tilted counter-clockwise, as indicated in the third compartment shown in Figure 4, or they may be tilted in a clockwise direction, as shown in the fourth or right hand compartment 14 illustrated in Figure 4. When the trays are first filled with eggs, they will ordinarily be left in the horizontal position for two or three days. After that they will be periodically tilted alternately in the counter-clockwise and clockwise direction until about the 18th day of the incubating period. Thereafter, they will be removed to the hatching compartments 20 where they will be supported upon stationary slide bars 45 above nursery trays 46. Preferably, one nursery tray 46 will be provided for each pair of egg trays in the compartment and the nursery trays will be supported by bars 47 similar to the bars 45.

The means for heating, ventilating and humidifying the several compartments will now be described and, inasmuch as the heating and ventilating means for the compartments 14 are intimately and co-operatively associated, these will be described together.

The end compartments 10 and 11 are provided with radiators 50 and 51. The end walls of the incubator casing are each provided with a pair of holes 52 adapted to be closed, in whole or in part, by suitable shutters or slide valves 53 mutually movable in ways 54. The radiators are preferably formed of a series of interconnected vertical pipes adjacent to these holes. Each of the end compartments 10 and 11 is provided with an air circulating fan 58 journalled in a suitable frame 59, the upper and lower bars of which are channelled and fitted to guide walls 60. The frames 59 may therefore be adjusted to deliver air into the compartments 14 on either side of the central partition 15. The fan in the compartment 11 may therefore be adjusted to deliver air to compartments 14 on one side of the partition 15 and the fan in the compartment 10 adjusted to deliver air to the compartments 14 on the other side of the central partition, thereby providing for a continuous circulation of air in a right direction on one side of the partition and in a left hand direction on the other side, the end compartments serving as a means for communication between the two passages. Set screws 64 secure the frames to the guide.

Humidifying pans 65 may be provided in each end compartment and the area exposed to evaporation may be regulated in accordance with the requirements by superposed shutters or lids 66.

Circulation of a heating fluid through the radiators may be provided for in any convenient manner. In Figure 4, a service pipe 67 leads to the radiator in compartment 10. The heating fluid may pass from this radiator along the outer walls near the top of the incubator through the pipes 70 to the radiator 51 in the chamber 11 and thence through a return flow duct 71 to the heater (not shown).

Figure 2:
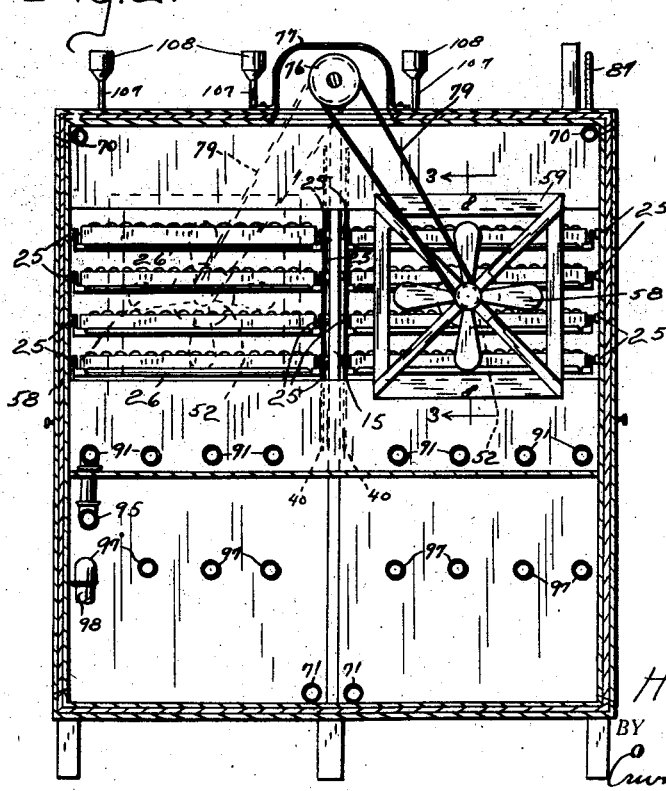
Figure 2 is a sectional view, drawn on line 2—2 of Figure 1.
Figure 3:
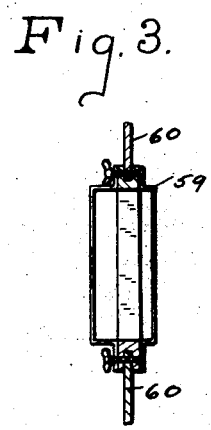
Figure 3 is a detail view in vertical section on line 3—3 of Figure 2, showing one of the fan supporting slides with the fan omitted.

The fans may be driven from a shaft 75 having pulleys 76 in housings 77, which are centrally located above the end compartments 10 and 11, the top walls of said compartments being apertured to allow the pulleys 76 to be operatively connected with the fans by belts 79. The apertures are of sufficient transverse dimensions to allow the fan supporting frames 59 to be shifted from side to side, as indicated by dotted lines in Figure 2, thereby providing means for reversing the flow of air through the incubator.

In operation, the fans will circulate the air through the various compartments 14 and the end compartments 10 and 11, a portion of the air escaping through the vent hole 52 in line with the fan at the opposite end of the incubator and this air being replaced by fresh air entering through the hole on the suction side of the fan. Each fan will therefore draw in fresh air on its suction side and will eject a corresponding quantity of partially vitiated air at the opposite end of the incubator through the hole in the path of the air current. This allows for a substantially continuous replacement of a portion of the air in sufficient quantity to prevent the atmosphere within the incubator from becoming vitiated to such an extent as to interfere with the growth and development of the incubating chicks. A thermostat 82 of an ordinary type, such as a mercury pressure thermostat, is provided with a pressure tube 83 leading to a thermostatically controlled valve at 84 which regulates the flow of the heating fluid through the service or supply pipe 67. A hygrometer 87 is also preferably employed to indicate the degree of humidity in the incubating chambers 14, all of the chambers 14 being interconnected and subject to the same forced air current. One thermostat and one hygrometer will be adequate to indicate the degree of heat and the degree of humidity throughout this portion of the incubator.

The means for heating and ventilating the compartments 20 will now be described, together with auxiliary means for independently supplying heat to the compartments 14. A service pipe 90 leads from a source of heated fluid supply to a set of horizontally disposed radiator pipes 91 which extend along the floor of the compartments 14. Any suitable number of these pipes may be provided and connected by cross heads 93 at their respective ends. Some of the pipes operate as return-flow pipes and are connected with the return-flow conduit 95. Similarly, the service pipe 90 is connected with a series of pipes 97 which extend horizontally through the upper portions of the hatching compartments 20, similar headers being employed and the return-flow pipes being connected with a conduit 98 which returns the cooled liquid to the heater. The exact arrangement of the heater pipes and radiators in the several compartments is not deemed essential to the invention herein described and a more detailed illustration and description is, therefore, deemed unnecessary.

Each of the compartments 20 is preferably independently ventilated through an aperture in its top wall, the capacity of which is controlled by a thermostatically operated valve or damper 100. The thermostats 101 in the respective compartments 20 are connected with their associated valves by link rods 102 and levers 103, said levers being provided with weighted short arms 104 which tend to hold the valves in open position. The compartments 20 may be provided with humidifying pans 106 located underneath the nursery trays. Each of the radiator systems is provided with a vertically extending pipe 107 leading to an open expansion tank 108. A series of small openings 109 allows fresh air to enter the compartments 20 to replace the air that passes outwardly through the vent openings. These inlet openings 109 are preferably formed in the front wall of the compartment as shown.

From the foregoing description, the mode of operation may be readily understood, but a brief review may be desirable. In Figure 4, the left hand compartments 14 may be regarded as the compartments which has been freshly charged with eggs and the egg trays are therefore adjusted in a horizontal position. The right hand compartments 14 have the egg trays tilted and therefore may be assumed to contain eggs in a more advanced stage of incubation. These assumptions are based on the ordinary practice of leaving eggs undisturbed for the first three days. However, the eggs may be periodically tilted from the beginning and as all the trays are alike, they may be initially placed in any tray or set of trays, and the trays tilted periodically and alternatively in clockwise and counter-clockwise directions and utilized to subdivide the air current and direct it upwardly and then downwardly while permitting it to also pass through the notches 36 in the egg trays and through the foraminous bottoms of the egg trays and between and around the eggs.

The bottom plates 26 of the supporting trays and the vertical walls of the egg trays 35, co-operate to protect the major portions of the egg surfaces from the drying and chilling effects to which they would be subjected if the circulating air were permitted to flow between and around the eggs. When the trays are tilted in a clockwise direction the eggs are almost wholly protected from direct draft. When the trays are tilted in the opposite direction the circulating air is subdivided into streams which pass between the the trays, but these streams of air are usually lifted above the surfaces of the eggs by the side walls of the egg trays 35. The air impinging on these side walls is in part deflected upwardly although the major portion passes downwardly and merges in the subdivided stream passing underneath the tray. The part which turns upwardly tends to lift the superposed subdivided stream or sheet of air above the eggs and any air that strikes against the eggs is similarly deflected and caused to move upwardly whereby the entire sheet or stream of air has its major velocity at a distance above the eggs for the same reason that air blowing over a rough or uneven surface tends to lift therefrom. For these reasons and for the further reason that only one half of the exposed upper surface of each egg receives even this modified draft and receives it for only one half of that portion of the incubating period during which the trays are tilted, the drying and chilling effects exerted by the moving air currents upon the eggs are entirely negligible.

The air thus deflected upwardly by those trays which are tilted in a counter-clockwise direction will be again deflected downwardly by the supporting trays and egg trays when it reaches compartments having trays tilted in a clockwise direction. The air will then be deflected downwardly toward the bottom of this portion of the incubator. When the air reaches the compartment 11, the fan therein, if properly positioned, will direct the major portion of it along the other side of the central partition, the remainder being caused to pass through one of the apertures 52 and replaced by fresh air through the aperture in registry with the suction side of the fan. After an egg tray has been in the incubator eighteen days, it is removed from its compartment 14 by lifting it from its supporting tray, as indicated in the upper portion of Figure 5. This egg tray is then inserted in one of the compartments 20 where it remains in a stationary and horizontal position, pending the hatching of the chicks. As the chickens hatch, they are permitted to jump from the egg tray into the nursery tray 46, there being sufficient space at the ends of the egg trays or between the egg trays to allow the chickens to pass downwardly.

With the radiators in the position in which they are illustrated in the drawings, some heat will be imparted to the air which is escaping from the incubator but the radiation area exposed to this outwardly passing current is so small that the heat loss will be negligible. If the radiators were not located in front of the apertures, it would be difficult to sufficiently temper the incoming air and the advantage of locating the radiator as illustrated and described in this specification is therefore believed to more than offset the disadvantage resulting from the loss of heat units above referred to.

The shaft 75 may be driven from any suitable source of power such, for example, as an electric motor 110 shown in the pulley housing 77 at the right hand end in Figure 4. But at the left hand end of the shaft 75 a pulley 111 is illustrated, whereby the shaft may be driven from any other source of power by means of a belt, if electric power is not available or if the motor 110 should become inoperative.

For convenience in this description, I refer to that portion of the incubator which contains eggs during the first eighteen days of their incubation as the incubating compartment, or compartments, and the portion in which the eggs are placed after the eighteenth day is referred to as the hatching compartment, or compartments.

I claim:

1. An incubator having in combination sets of hatching compartments and a superposed incubating compartment provided with air inlet and vent apertures, a heating system common to all the compartments and including radiating circulation pipes extending through the respective compartments to heat the air therein by direct radiation, means for maintaining forced circulation of air throughout the incubating compartment, separate circulation pipes connected with said heating system and disposed in the path of the fresh air entering the incubating compartment through its air inlet, and a set of egg trays adapted to be supported interchangeably in any of said compartments, said egg trays and their supports in the incubating compartments being constructed and disposed to provide oblique deflectors in the path of the circulating air.

2. In an incubator, the combination with end portions having apertured walls adapted to permit entry and escape of air, an intermediate egg receiving portion provided with egg trays, heating means in each end portion and air impelling means in each end portion, co-operative with the heating means, apertured walls and egg trays for controlling the direction of air circulation and degree of temperature throughout the intermediate portion.

3. An incubator, comprising the combination of an incubating compartment, motor driven means for reversibly circulating air in a generally horizontal direction therethrough, said compartment being provided with vent openings for permitting a substantially continuous escape of portions of the circulating air through one of the openings and its replacement by the introduction of fresh air through another opening, and thermostatically controlled means adjacent to said openings for heating the air.

4. An incubator, comprising the combination of an incubating compartment, motor driven means for circulating air therein, said compartment being provided with vent openings for permitting a substantially continuous escape of portions of the circulating air through one of the openings and its replacement by the introduction of fresh air through another opening, thermostatically controlled means adjacent to said openings for heating the air, a hatching compartment provided with a gravity ventilating system, means for heating the respective compartments, co-operating means for supporting egg trays interchangeably in the respective compartments, and thermostatic means for separately controlling the heat and ventilation thereof.

5. In an incubator, the combination with means for forcing air therethrough in a generally horizontal direction, of a series of inclinable egg tray supports provided with bottom baffle plates adapted to subdivide and deflect the air in its passage through the incubator and egg tray side walls co-operative with said baffle plates to protect the eggs from direct draft through the spaces between them.

6. An incubator, comprising the combination with an enclosure provided with egg trays therein, of motor operated means for circulating air in a generally horizontal direction through said inclosure, a series of movable and substantially impervious baffles within the enclosure adapted to be adjusted in various positions and inclinations in the path of the circulating air, said baffles and the side walls of the egg trays co-operating to prevent the circulating air from being driven between and over the major portions of the egg surfaces to dry and chill them.

7. In an incubator, the combination of a series of egg receiving compartments, provided with egg trays and having communicating connections forming, with the compartments, an endless passage for a horizontally circulating air current, motor driven impelling devices for maintaining continuous circulation in said passage, adjustable deflecting means within the egg compartments adapted to effect a vertical equalization of heat and rate of flow at different levels, by directing air across strata forming streams, means for allowing the continuous escape of a predetermined proportion of the circulating air and its replacement by fresh air, and means for heating the circulating air.

8. In an incubator, the combination of a series of egg receiving compartments, provided with egg trays and having communicating connections forming, with the compartments, an endless passage for a horizontally circulating air current, motor driven impelling devices for maintaining continuous circulation in said passage, means for allowing the continuous escape of a predetermined proportion of the circulating air and its replacement by fresh air, and means for heating the circulating air, each egg receiving compartment having baffles adapted to subdivide and direct the air in its passage through such compartment, said baffles being disposed to equalize the air flow and temperature at the various levels and throughout the compartments.

9. In an incubator, parallel series of egg receiving compartments, and connecting end compartments adapted to allow air to pass from one series to another at the respective ends of the series, impellers in the end compartments adapted to churn, remix and equalize the air pressure at the receiving end of each of the compartments of successive series, and means for adjusting the impellers to reverse the direction of air flow in the respective compartments.

10. In an incubator, parallel series of egg receiving compartments, and connecting end compartments adapted to allow air to pass from one series to another at the respective ends of the series, impellers and associated heaters in the end compartments adapted to reheat, mix and drive air with equalized pressure through the inlets of the respective compartments of successive series, means for adjusting the impellers to reverse the direction of air flow in the respective compartments, and means for continuously venting a portion of the circulating air and admitting a corresponding quantity of fresh air to the end compartments.

11. In an incubator, parallel series of egg receiving compartments, and connecting end compartments adapted to allow air to pass from one series to another at the respective ends of the series, impellers in the end compartments adapted to force air in different directions in the compartments of successive series, means for adjusting the impellers transversely of the end compartments from a position in line with one egg receiving compartment to a position in line with the other to reverse the direction of air flow in the respective compartments, and means for heating and humidifying the air and continuously replacing portions thereof.

12. In an incubator, parallel series of egg receiving compartments, and connecting end compartments adapted to allow air to pass from one series to another at the respective ends of the series, impellers in the end compartments adapted to force air in different directions in the compartments of successive series, means for adjusting the impellers to reverse the direction of air flow in the respective compartments, and inclinable air deflecting egg supporting devices in the respective compartments.

13. In an incubator, an incubating egg chamber, power driven means for forcing air through said chamber, a series of egg trays disposed in the path of the air currents forced through such chamber, and baffles so disposed with reference to the egg trays as to prevent direct contact of the main air currents with the major portions of the egg surfaces while allowing free lateral circulation from the vicinity of the eggs into adjacent air currents, the side walls of the egg trays being spaced from the baffles in their intermediate portions to allow air to flow between the baffles and the bottoms of the trays, said baffles being adapted to sub-divide the driven air and distribute the sub-divided currents throughout the chamber in the spaces between and about the egg trays, said egg trays being spaced from the baffles and provided with perforated bottoms to allow a relatively slow induced circulation of air about the eggs.

14. In an incubator, an incubating egg chamber, a series of sets of tray supporting shelves, each substantially impervious to air and each pivotally supported at its respective ends and linked to other shelves in the same set, the shelves of each set being individually pivoted for tilting movements and the shelves of successive sets being adapted to be tilted in opposite directions, egg trays for said shelves, means for supporting the egg trays with their bottoms in spaced relation to the shelves and power means for forcing air through said chamber along generally horizontal lines.

15. In an incubator, the combination of an incubating egg chamber, a series of superposed tray supporting shelves each provided with pivoted hangers at its respective ends and adapted to be swung about the axes of the hanger pivots, egg trays, each having recessed walls spaced from the associated shelf and a foraminous bottom adapted to allow air to pass from the space between the shelf and the tray through the eggs in the tray and upwardly between the eggs, said trays being adapted to protect the eggs from direct draft of air circulating in such chamber.

16. In an incubator, an incubating egg chamber, a tray supporting shelf provided with hangers at its respective ends, and raised tray supporting projections on the shelf, in combination with an egg tray having recessed walls and a foraminous bottom adapted to allow air to pass between the shelf and the eggs in the tray and upwardly between the eggs, a hatching chamber to which the egg tray may be removed during the final stages of incubation, means for establishing forced ventilation and warm air circulation in the incubating egg chamber, a heating system including circulatory pipes within the incubating and hatching chambers, and additional circulatory pipes in the path of the air admitted to the incubating chamber for the purpose of said forced ventilation, and means for permitting gravity ventilation in the hatching chamber.

17. In an incubator having a series of air passages, connecting end chambers, a set of impeller fans, one for each end chamber and faced for co-operation with the other to promote a continuous flow of air from each end chamber through one of the passages and its return through the other, and fan supporting devices in the connecting passages adapted to be adjusted to carry their associated fans into position for air delivery to different passages.

18. In an incubator having egg compartments forming plural air passages leading horizontally and longitudinally therethrough, the combination with the egg compartments, of end compartments connecting said passages and provided with holes in their outer walls adapted to serve both as inlets and outlets under varying pressure conditions due to relative movement of the interior and exterior atmosphere and impeller fans in the end compartments.

19. In an incubator having egg compartments forming plural air passages leading horizontally and longitudinally therethrough, the combination with the egg compartments, of end compartments connecting said passages and provided with vent holes, impeller fans in the end compartments, and housed exterior driving connections operatively connected with the fans, said fans being shiftable into registry with different passages, and the walls of the compartment being slotted to allow the driving connections to be correspondingly swung in correspondence to the shifting movement of the fans.

20. In an incubator, the combination with parallel sets of longitudinally extending tiers of egg trays and a partition wall extending between said sets, said partition and the walls of the incubator forming longitudinal passages in communication with each other at their respective ends of a fan chamber constituting one of said communicating means, an impeller fan therein, a supporting frame for the fan, horizontally extending guide walls along which the frame may be shifted into registry with either passage, and means for securing the frame to said walls in various positions of adjustment with reference to the egg chamber.

21. In an incubator having egg compartments forming plural air passages leading horizontally and longitudinally therethrough the combination with the egg compartments, of end compartments connecting said passages and provided with vent holes, impeller fans in the end compartments, housed exterior driving connections operatively connected with the fans, and radiators interposed between the impeller fans and vent holes.

22. An incubator having upper and lower portions spaced from each other for free circulation of air between them, the combination of a gravity ventilating system for the lower portion, a motor driven ventilating and air circulating system for the upper portion, a heating system including a service pipe having connections leading to the upper and lower portions, respectively, another heating system for the upper portion, a thermostatic device directly controlling the ventilating system of the lower portion and indirectly controlling the temperature thereof and a thermostatic device directly controlling the supply of heating medium to the other system in the upper portion.

23. An incubator provided with parallel egg chambers, each provided with egg trays disposed in superposed lineally extending sets in combination with end chambers opening in common to both sets of egg chambers, heating means in the end chambers, air impelling devices in the end chambers, one for each egg chamber and each arranged to drive air in a direction opposite to that in which air is driven in the adjacent chamber, and means throughout each egg chamber for protecting the major portion of the eggs from direct drafts, said egg protecting means being also adapted to direct the air along paths inclined alternately in opposite directions whereby to constantly intermix the various portions of the current.

HARRY M. LACKIE.